(12) United States Patent
Gu

(10) Patent No.: US 10,483,624 B2
(45) Date of Patent: Nov. 19, 2019

(54) ANTENNA SYSTEM AND MOBILE TERMINAL

(71) Applicant: AAC Technologies Pte. Ltd., Singapore (SG)

(72) Inventor: Haichuan Gu, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 0 days.

(21) Appl. No.: 16/057,961

(22) Filed: Aug. 8, 2018

(65) Prior Publication Data

US 2019/0207297 A1 Jul. 4, 2019

(30) Foreign Application Priority Data

Dec. 29, 2017 (CN) .......................... 2017 1 1475334

(51) Int. Cl.
*H01Q 1/24* (2006.01)
*H01Q 13/16* (2006.01)
*H01Q 5/35* (2015.01)

(52) U.S. Cl.
CPC ............... *H01Q 1/243* (2013.01); *H01Q 5/35* (2015.01); *H01Q 13/16* (2013.01)

(58) Field of Classification Search
CPC ........... H01Q 1/243; H01Q 5/35; H01Q 13/16
See application file for complete search history.

(56) References Cited

U.S. PATENT DOCUMENTS

| 10,389,025 | B2 * | 8/2019 | An ......................... H01Q 5/335 |
| 2015/0123871 | A1 * | 5/2015 | Chang .................... H01Q 1/243 343/872 |
| 2018/0261921 | A1 * | 9/2018 | Ha ......................... H01Q 1/243 |

* cited by examiner

*Primary Examiner* — Robert Karacsony
(74) *Attorney, Agent, or Firm* — IPro, PLLC; Na Xu

(57) ABSTRACT

The present disclosure relates to the field of antenna technologies and, in particular, to an antenna system and a mobile terminal. The antenna system includes: a metal rear cover, a first feeding point, and a system ground, wherein a U-shaped slot is arranged at a bottom of the metal rear cover, and the U-shaped slot divides the metal rear cover into a radiation portion and a grounding portion, the grounding portion is connected to the system ground, the radiation portion includes a first end and a second end, and both the first end and the second end are connected to the grounding portion, a break is defined at the radiation portion, and the radiation portion is electrically connected to the first feeding point, so as to form a main antenna.

18 Claims, 7 Drawing Sheets

ANTENNA SYSTEM AND MOBILE TERMINAL

CROSS-REFERENCE TO RELATED APPLICATIONS

The present application claims priority to Chinese Patent Application No. 201711475334.4, filed on Dec. 29, 2017, the content of which is incorporated herein by reference in its entirety.

TECHNICAL FIELD

The present disclosure relates to the field of communication technologies and, in particular, to an antenna system and a mobile terminal.

BACKGROUND

With the rapid development of communication technologies, mobile terminals have become indispensable tools in peoples' life. For achieving a better design appearance and a better handheld experience, metal rear cover are increasingly used in the design of mobile terminals.

At present, for antenna design of a mobile terminal with a metal rear cover, usually, a double-break structure is arranged at the bottom of the metal rear cover or at both sides of the metal rear cover, or a clearance region is enlarged, so as to improve mode compatibility and increase the bandwidth. However, these manners will reduce structural strength and design texture of the metal rear cover.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

REFERENCE SIGNS

10—metal rear cover;
100—radiation portion;
100a—break;
100b—first end;
100c—second end;
102—grounding portion;
104—U-shaped slot;
12—first feeding point;
14—second feeding point;
16—grounding point;
18—impedance matching circuit;
180—capacitance element;
181—first inductance element;
182—second inductance element;
183—third inductance element;
184—adjustable inductance element;
185—adjustable capacitance element;
186—matching switch;
20—first switch;
22—second switch.

The drawings herein are incorporated into and constitute a part of the present specification, which show the embodiments of the present disclosure and illustrate the principles of the present disclosure together with the specification.

DESCRIPTION OF EMBODIMENTS

The present disclosure will be further described in detail in the following through specific embodiments and with reference to the accompanying drawings.

Figure 1:
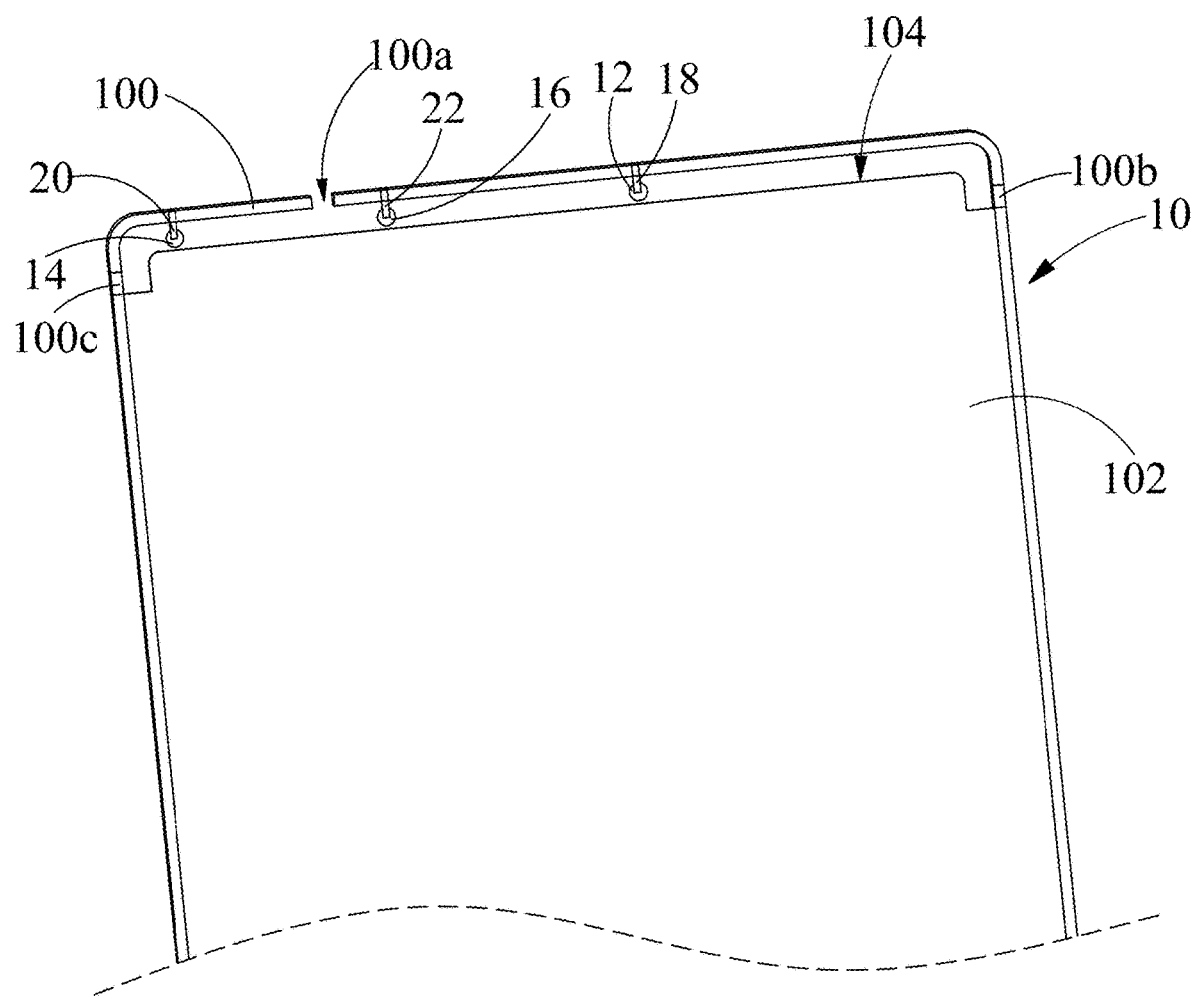
FIG. 1 is a structural schematic diagram of an antenna system according to an embodiment of the present disclosure.

As shown in FIG. 1, an embodiment of the present disclosure provides an antenna system, which can be applied to a mobile terminal such as a mobile phone, a tablet computer or the like. The mobile terminal includes a metal rear cover 10. The rear cover of the mobile terminal is made of a metal material, which not only can improve the design appearance and structural strength of the mobile terminal, but also can enable the metal rear cover 10 to be a part of the antenna system of the mobile terminal. That is, the antenna system of the mobile terminal may include the metal rear cover 10. A U-shaped slot 104 is defined at the bottom of the metal rear cover 10, and the U-shaped slot 104 is a clearance area of the antenna system and divides the metal rear cover 10 into a radiation portion 100 and a grounding portion 102 of the antenna system. The radiation portion 100 includes a first end 100b and a second end 100c, which are connected to the grounding portion 102, respectively. A break 100a is provided at the radiation portion 100, and the break 100a is in communication with the U-shaped slot 104.

In one embodiment, the antenna system further includes a first feeding point 12 and a system ground. The first feeding point 12 is electrically connected to the radiation portion 100, and the system ground is connected to the grounding portion 102, so as to form a main antenna. The first feeding point 12 and the break 100a divide the radiation portion 100 into three sections, namely a first section, a second section, and a third section. The first section is a portion of the radiation portion 100 from the first end 100b to the first feeding point 12. The second section is a portion of the radiation portion 100 from the first feeding point 12 to the break 100a, and the third section is a portion of the radiation portion 100 from the break 100a to the second end 100c.

In one embodiment, the radiation portion 100 is electrically connected to first feeding point 12, and a single break 100a is provided at the radiation portion 100. The radiation portion 100 is therefore divided into three sections. Each section of the radiation portion 100 can excite a working mode, and any combination of the three sections can excite a working mode. The antenna system is in a 3CA state and can excite more modes and increase the bandwidth.

In one embodiment, the main antenna includes a first working frequency band, a second working frequency band, and a third working frequency band. The first working frequency band is 700 MHz-960 MHz. The main radiator of the first working frequency band includes the first section and the second section. The first working frequency band includes four modes (a mode refers to a current resonance state), and these four modes are all excited by the first section and the second section. The second working frequency band is 1710 MHz-2700 MHz, and the main radiator of the second working frequency band includes the second section and the third section. The second working frequency band includes three modes, namely a first mode, a second mode, and a third mode. The first mode is excited by the second section, the second mode is excited by the second section and the third section or excited by the third section, the third mode is excited by the second section and the third section. The third working frequency band is 3300 MHz-3800 MHz, and the main radiator of the third working frequency band includes the first section, the second section, and the third section. The third working frequency band includes two modes, one of the two modes is excited by the first section, the second section and the third section, and the other one of the two modes is excited by the first section.

In addition, the technical solution of the present disclosure can improve the structural strength and the design appearance of the metal rear cover, thereby improving users' satisfaction, compared to the technical solution in the related art that the metal rear cover is provided with a double-break structure.

The first working frequency band is lower than the second working frequency band, therefore, a total length of the first section and the second section may be larger than a total length of the second section and the third section so as not to affect the radiation performance of the antenna system under the first working frequency band and under the second working frequency band.

Optionally, widths of the U-shaped slot 104 and the break 100a is within a range of 1.5 mm-3 mm. Preferably, the width of the U-shaped slot 104 is approximately 2.5 mm, and the width of the break 100a is approximately 2 mm. By making the widths of the U-shaped slot 104 and the break 100a within the range of 1.5 mm-3 mm, on the one hand, it prevents the strength of the metal rear cover from being decreased resulting from the widths of the U-shaped slot 104 and the break 100a from being excessively large and, on the other hand, it prevents the performance of the antenna system from being influenced resulting from the widths of the U-shaped slot 104 and the break 100a being excessively small. It should be understood that, the specific dimension may be larger than 3 mm or smaller than 1.5 mm due to manufacture and assembly errors, as long as it does not influence the performance of the antenna system.

Figure 2:
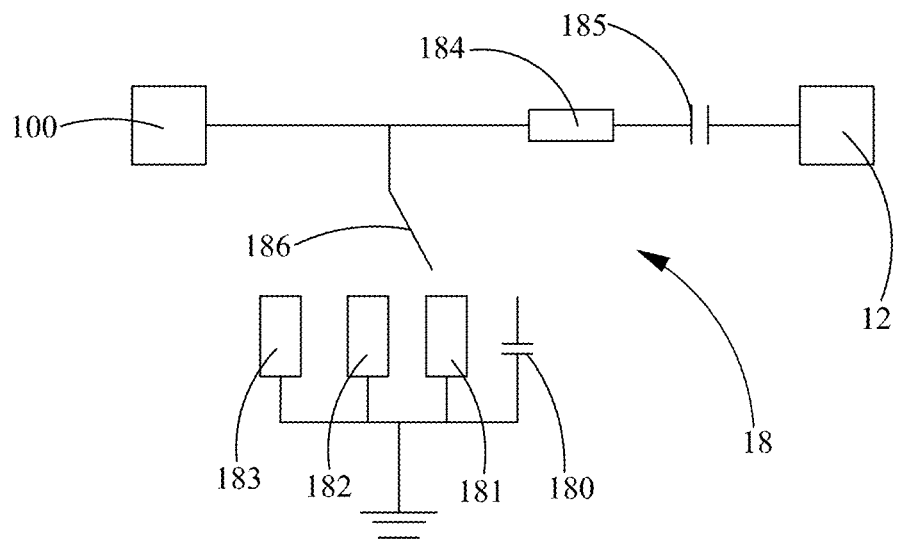
FIG. 2 is a schematic diagram of an impedance matching circuit in an antenna system provided by an embodiment of the present disclosure.
Figure 3:
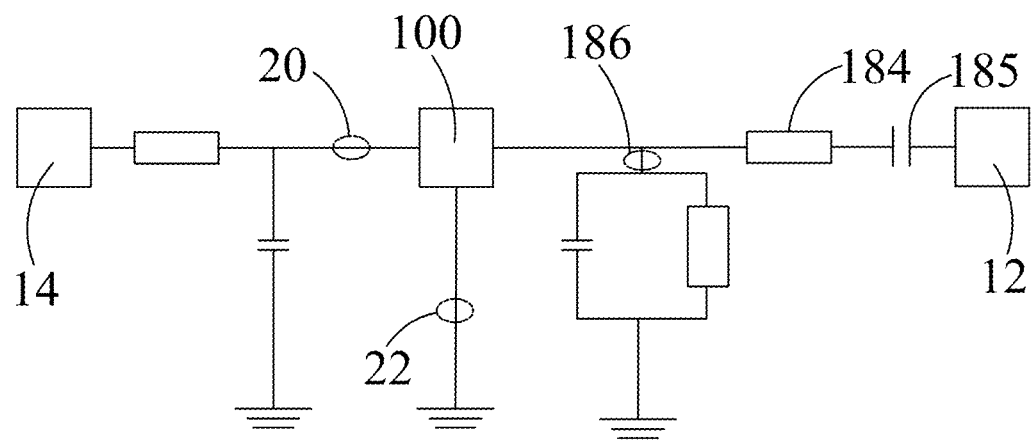
FIG. 3 is a schematic diagram of a matching circuit, with a first switch and a second switch being in a closed state, in an antenna system according to an embodiment of the present disclosure.

In an embodiment of the present disclosure, as shown in FIGS. 1-3, the antenna system further includes an impedance matching circuit 18. The impedance matching circuit 18 connects the radiation portion 100 to the first feeding point 12. Specifically, the impedance matching circuit 18 includes a first branch circuit and a second branch circuit. The first branch circuit includes two ends that are electrically connected to the first feeding point 12 and the radiation portion 100, respectively, and the second branch circuit is connected to the first branch circuit. The second branch circuit is provided with a matching switch 186 and a plurality of different grounding elements. The matching switch 186 may be connected to at least one of the grounding elements. By connecting the matching switch 186 to different grounding elements, the state of the first working frequency band can be switched so as to adjust the radiation efficiency of the antenna system in time.

Optionally, the grounding elements include at least one inductance element and a plurality of capacitance elements 180, or a plurality of inductance elements and at least one capacitance element 180. The value of each inductance element or the value of each capacitance element 180 is different from one another. The reactance of the capacitance element 180 and the reactance of the inductance element are correspondingly named as capacitive reactance and inductive reactance, the higher the frequency is, the smaller the capacitive reactance is and the larger the inductive reactance is, likewise, the lower the frequency is, the larger the capacitive reactance is and the smaller the inductive reactance is.

In one embodiment, as shown in FIG. 2, four different grounding elements are disposed in the second branch circuit, which are a capacitance element 180, a first inductance element 181, a second inductance element 182, and a third inductance element 183. The capacitance element 180 may have a value of 0.3 P. When the matching switch 186 is switched to the capacitance element 180, the resonance point of the first working frequency band is 700 MHz. The first inductance element 181 may have a value of 82n. When the matching switch 186 is switched to the first inductance element 181, the resonance point of the first working frequency band is 800 MHz. The second inductance element 182 may have a value of 55n. When the matching switch 186 is switched to the second inductance element 182, the resonance point of the first working frequency band is 850 MHz. When the matching switch 186 is switched to the third inductance element 183, the resonance frequency of the first working frequency band is 900 MHz.

Figure 4:
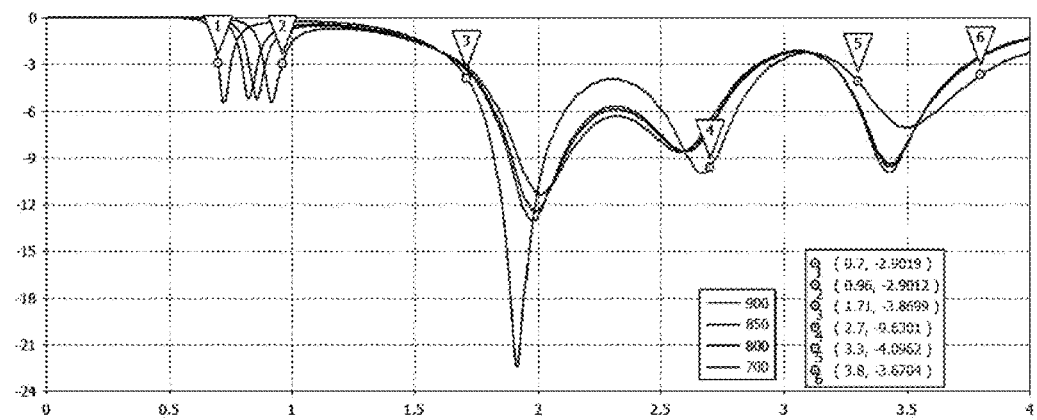
FIG. 4 is a return loss diagram with a first switch and a second switch being in an open state in an antenna system according to an embodiment of the present disclosure.
Figure 5:
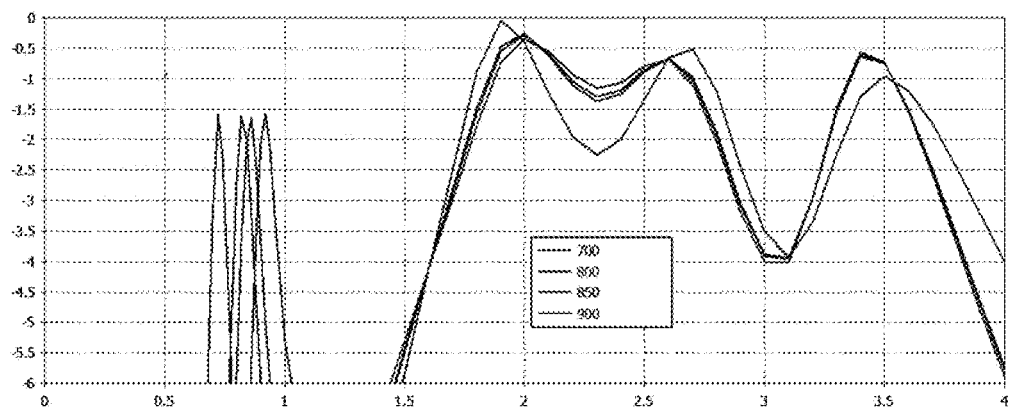
FIG. 5 is a system efficiency diagram with a first switch and a second switch being in an open state in an antenna system according to an embodiment of the present disclosure.

FIG. 4 and FIG. 5 respectively show a return loss diagram and a system efficiency diagram with a first switch 20 and a second switch 22 being in an open state in an antenna system according to an embodiment of the present disclosure.

As shown in FIG. 4 and FIG. 5, the respective X-axis in FIG. 4 and FIG. 5 represents frequency in unit of GHz, the Y-axis in FIG. 4 represents return loss parameter (S-Parameter) in unit of dB, and the Y-axis in FIG. 5 represents radiation efficiency in unit of dB. Specifically, the four lines in FIG. 4 respectively represent return losses of the first working frequency band in four states. The four solid lines in FIG. 5 respectively represent system efficiencies of the first working frequency band in four states. As can be seen from FIG. 4 and FIG. 5, the antenna system in this embodiment fully utilizes the impedance matching principle to reduce the return loss of the antenna system, and the antenna system satisfies the isolation requirement of smaller than −15 dB.

It should be noted that each grounding element may also select other values depending on actual requirements in addition to the above-mentioned value.

An adjustable capacitance element 185 is provided at a position in the first branch circuit from a connection point with the second branch circuit to the first feeding point 12. The state of the first working frequency band can be fine adjusted by adjusting the value of the adjustable capacitance element 185, so as to further improve the radiation performance of the antenna system.

Optionally, an adjustable inductance element 184 is provided at a position in the first branch circuit from a connection point with the second branch circuit to the first feeding point 12. States of the second working frequency band and the third working frequency band can be fine adjusted by adjusting the value of the adjustable inductance element 184, so as to further improve the radiation performance of the antenna system.

In an embodiment of the present disclosure, the antenna system further includes a second feeding point 14, a grounding point 16, a first switch 20, and a second switch 22. The second feeding point 14 is connected to the third section through the first switch 20. The grounding point 16 is connected to the second section through the second switch 22. The first switch 20 and the second switch 22 both have a closed state and an open state. When both the first switch 20 and the second switch 22 are in the open state, the antenna system is in a single-antenna state, i.e., the antenna system only includes the above-mentioned main antenna. When both of the first switch 20 and the second switch 22 are in the closed state, the antenna system is in a multiple-input multiple-output (Multiple-Input Multiple-Output, MIMO) state. Specifically, the antenna system includes a first antenna and a second antenna. The main radiator of the first antenna is a portion of the radiation portion 100 from the grounding point 16 to the second end 100c. The main radiator of the second antenna is a portion of the radiation portion 100 from the grounding point 16 to the first end 100b, and both the working frequency band generated by the first antenna and the working frequency band generated by the second antenna are within the range of the above-mentioned second working frequency band and third working frequency band.

Preferably, the working frequency band generated by the first antenna and the working frequency band generated by the second antenna respectively have four states, which are Band7, Band41, Band42 and Band43. Here, Band7 and Band41 are within the range of the above-mentioned second working frequency band. Band42 and Band43 are within the range of the above-mentioned third working frequency band.

In one embodiment, the second feeding point 14 is electrically connected to the radiation portion 100 by closing the first switch 20. Since the first feeding point 12 is also electrically connected to the radiation portion 100, the antenna system will be in the MIMO state, thereby improving the communication frequency and communication quality of the antenna system at the second working frequency band and the third working frequency band. The main radiator of the first antenna and the main radiator of the second antenna are disposed on a same radiation portion 100, for alleviating mutual influence between the first antenna and the second antenna which may result in decreasing of the radiation performance of the antenna system, the second switch 22 needs to be closed while the first switch 20 is closed. The grounding point 16 can be connected to the radiation portion 100 by closing the second switch 22, so as to improve the isolation between the first antenna and the second antenna and improve the radiation performance of the antenna system.

Figure 6:
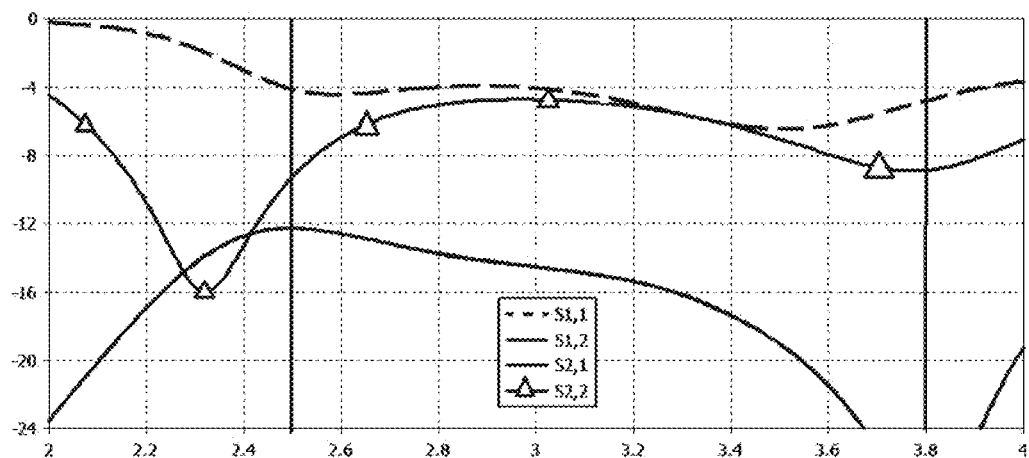
FIG. 6 is a return loss diagram with a first switch and a second switch being in a closed state in an antenna system according to an embodiment of the present disclosure.
Figure 7:
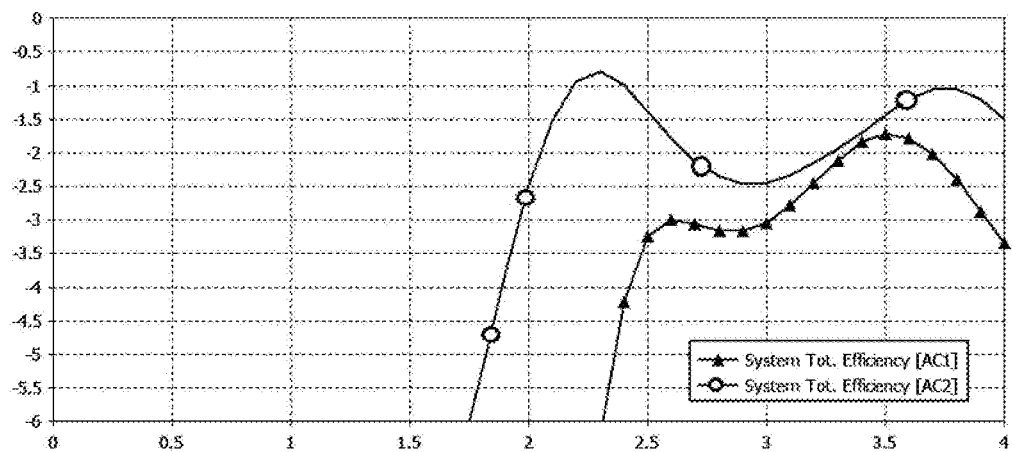
FIG. 7 is a system efficiency diagram with a first switch and a second switch being in a closed state in an antenna system according to an embodiment of the present disclosure.

FIG. 6 and FIG. 7 respectively show a return loss diagram and a system efficiency diagram with a first switch 20 and a second switch 22 being in a closed state in an antenna system according to an embodiment of the present disclosure As shown in FIG. 6 and FIG. 7, the respective X-axis in FIG. 6 and FIG. 7 represents frequency in unit of GHz, and the Y-axis in FIG. 6 represents return loss parameter (S-Parameter) in unit of dB. The Y-axis in FIG. 7 represents system efficiency in unit of dB. Specifically, in FIG. 6, the dashed line represents the return loss of the first antenna, the line with triangular blocks represents the return loss of the second antenna, and the solid line represents the isolation between the first antenna and the second antenna. In FIG. 7, the line with triangular blocks represents the system efficiency of the first antenna, the line with circles represents the system efficiency of the second antenna. As can be seen from FIG. 6 and FIG. 7, the antenna system in this embodiment fully utilizes the impedance matching principle to reduce the return loss of the antenna system, and the antenna system satisfies the isolation requirement of smaller than −15 dB.

The present disclosure further provides a mobile terminal, such as a mobile phone, a tablet PC, etc., including the antenna system described in any one of the above-mentioned embodiments.

The above-mentioned descriptions are merely preferred embodiments of the present disclosure and are not intended to limit the present disclosure. For those skilled in the art, the present disclosure may have various changes and modifications. Any modifications, equivalent substitutions, and improvements made within the spirit and principle of the present disclosure shall be included in the protection scope of the present disclosure.

What is claimed is:

1. An antenna system, comprising: a metal rear cover, a first feeding point and a system ground, wherein a U-shaped slot is arranged at a bottom of the metal rear cover, and the U-shaped slot divides the metal rear cover into a radiation portion and a grounding portion, the grounding portion is connected to the system ground, the radiation portion comprises a first end and a second end, and both the first end and the second end are connected to the grounding portion, a breaking joint is defined at the radiation portion, and the radiation portion is electrically connected to the first feeding point, so as to form a main antenna, wherein the main antenna has a first working frequency band, a second working frequency band and a third working frequency band, wherein the first working frequency band is 700 MHz-960 MHz, the second working frequency band is 1710 MHz-2700 MHz, and the third working frequency band is 3300 MHz-3800 MHz, wherein the first feeding point and the breaking joint divide the radiation portion into a first section, a second section and a third section, wherein the first section is a portion of the radiation portion from the first end to the first feeding point, the second section is a portion of the radiation portion from the first feeding point to the breaking joint, and the third section is a portion of the radiation portion from the breaking joint to the second end, and wherein a main radiator of the first working frequency band comprises the first section and the second section, a main radiator of the second working frequency band comprises the second section and the third section, and a main radiator of the third working frequency band comprises the first section, the second section and the third section.

2. The antenna system according to claim 1, further comprising an impedance matching circuit, wherein the impedance matching circuit comprises a first branch circuit and a second branch circuit, the first branch circuit has two ends electrically connected to the first feeding point and the radiation portion, respectively, the second branch circuit is connected to the first branch circuit, the second branch circuit is provided with a matching switch and a plurality of different grounding elements, and the matching switch is connectable to at least one of the plurality of different grounding elements.

3. The antenna system according to claim 2, wherein the plurality of different grounding elements comprises at least one inductance element and a plurality of capacitance elements, or comprises a plurality of inductance elements and at least one capacitance element, and each inductance element or each capacitance element has a value different from one another.

4. The antenna system according to claim 2, wherein an adjustable capacitance element is provided at a position in the first branch circuit from a connection point with the second branch circuit to the first feeding point.

5. The antenna system according to claim 1, further comprising a second feeding point, a grounding point, a first switch, and a second switch,
wherein the second feeding point is connected to the third section through the first switch, and the grounding point is connected to the second section through the second switch,
wherein both the first switch and the second switch have a closed state and an open state,
wherein when both the first switch and the second switch are in the open state, the antenna system comprises the main antenna,
wherein when both the first switch and the second switch are in the closed state, the antenna system comprises a first antenna and a second antenna, wherein a main radiator of the first antenna is a portion of the radiation portion from the grounding point to the second end, a main radiator of the second antenna is a portion of the radiation portion from the grounding point to the first end, and both a working frequency band generated by the first antenna and a working frequency band generated by the second antenna are within a range of the second working frequency band and the third working frequency band.

6. The antenna system according to claim 1, wherein a total length of the first section and the second section is larger than a total length of the second section and the third section.

7. The antenna system according to any one of claim 1, wherein both the U-shaped slot and the breaking joint have a width within a range of 1.5 mm-3 mm, respectively.

8. The antenna system according to any one of claim 2, wherein both the U-shaped slot and the breaking joint have a width within a range of 1.5 mm-3 mm, respectively.

9. The antenna system according to any one of claim 3, wherein both the U-shaped slot and the breaking joint have a width within a range of 1.5 mm-3 mm, respectively.

10. The antenna system according to any one of claim 4, wherein both the U-shaped slot and the breaking joint have a width within a range of 1.5 mm-3 mm, respectively.

11. The antenna system according to any one of claim 5, wherein both the U-shaped slot and the breaking joint have a width within a range of 1.5 mm-3 mm, respectively.

12. The antenna system according to any one of claim 6, wherein both the U-shaped slot and the breaking joint have a width within a range of 1.5 mm-3 mm, respectively.

13. A mobile terminal, comprising the antenna system according to claim 1.

14. A mobile terminal, comprising the antenna system according to claim 2.

15. A mobile terminal, comprising the antenna system according to claim 3.

16. A mobile terminal, comprising the antenna system according to claim 4.

17. A mobile terminal, comprising the antenna system according to claim 5.

18. A mobile terminal, comprising the antenna system according to claim 6.

* * * * *